Feb. 11, 1947. B. G. FREUND 2,415,738
ENDLESS CONVEYOR DRIER STRUCTURE
Filed Feb. 6, 1943 3 Sheets-Sheet 1
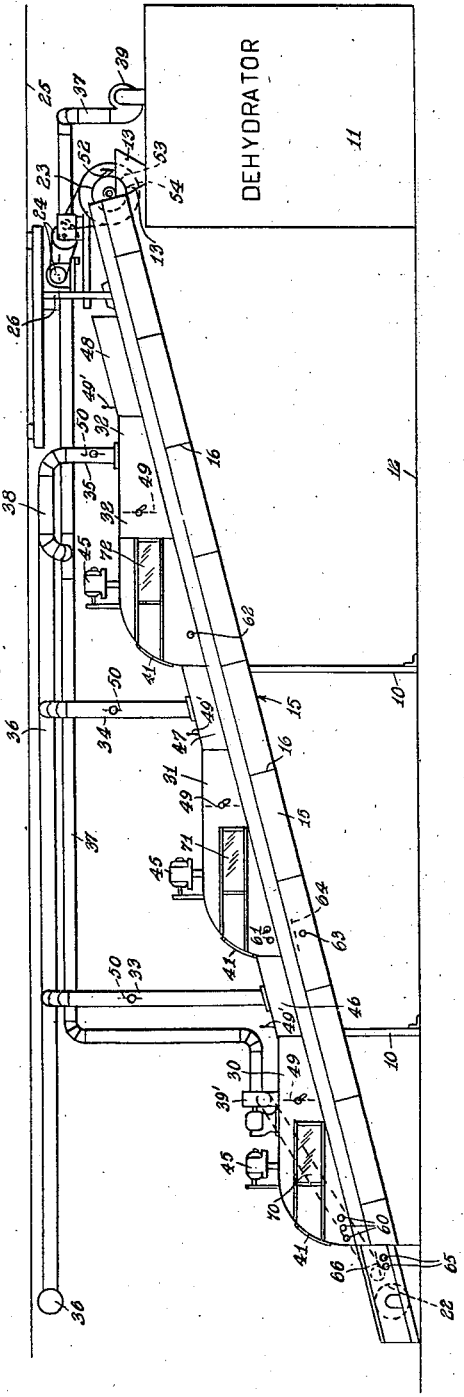
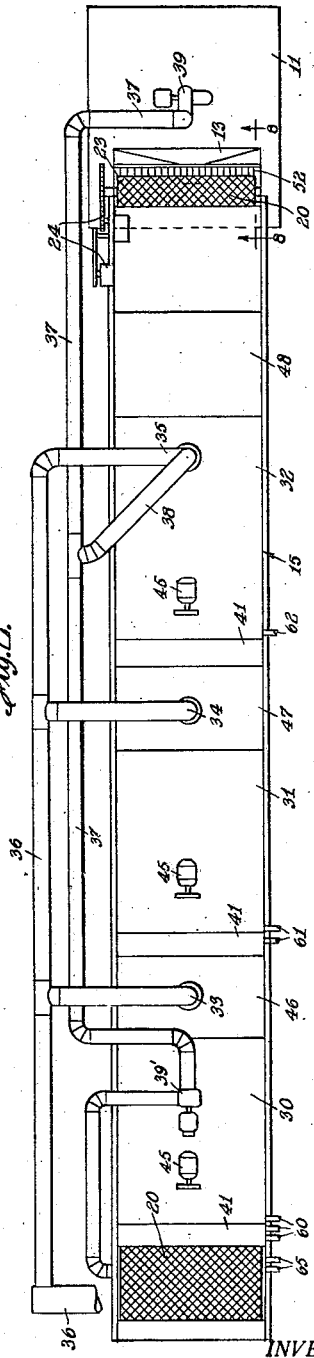
INVENTOR.
BERTHOLD G. FREUND
BY
ATTORNEY.

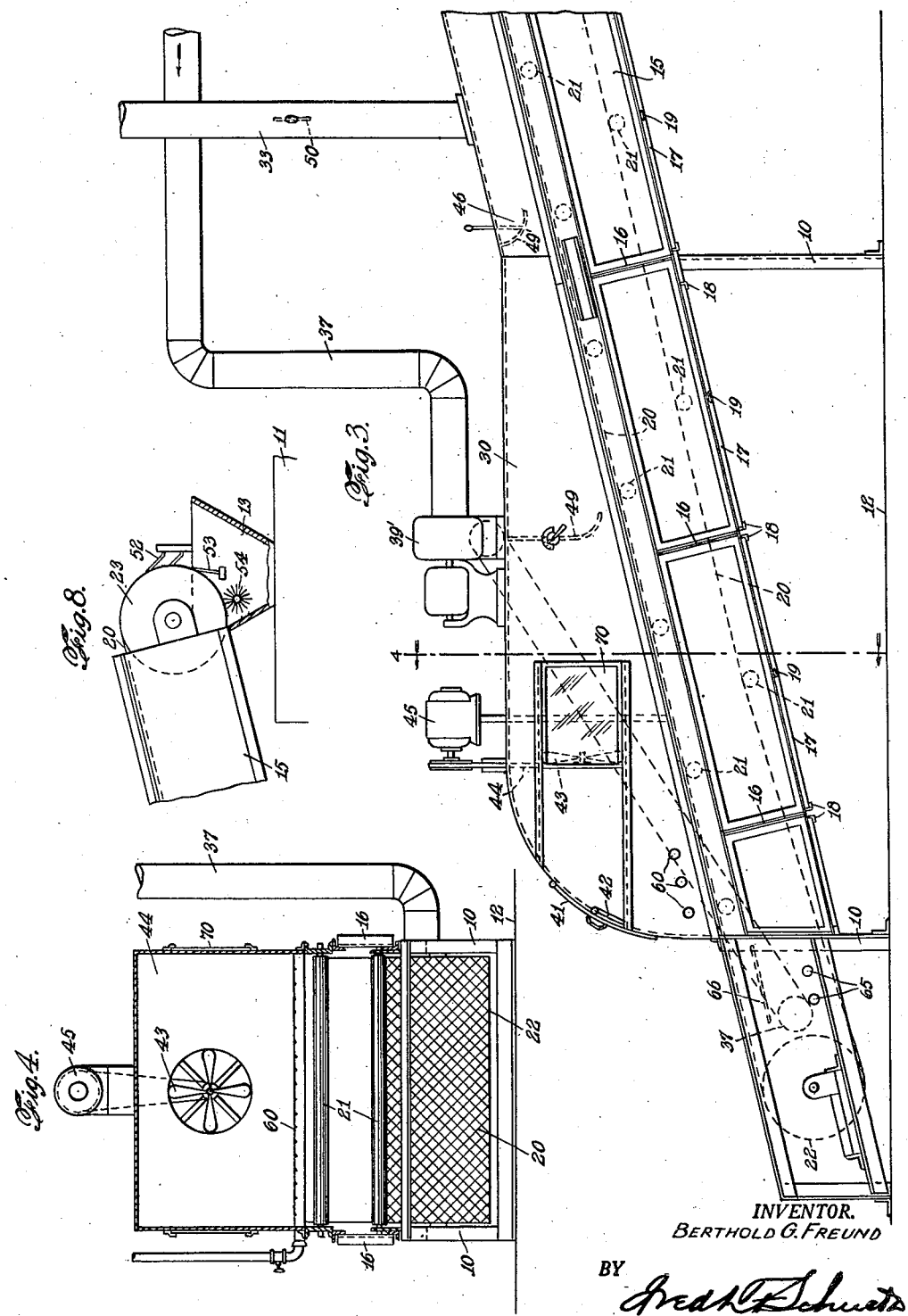

Feb. 11, 1947. B. G. FREUND 2,415,738
ENDLESS CONVEYOR DRIER STRUCTURE
Filed Feb. 6, 1943 3 Sheets-Sheet 3
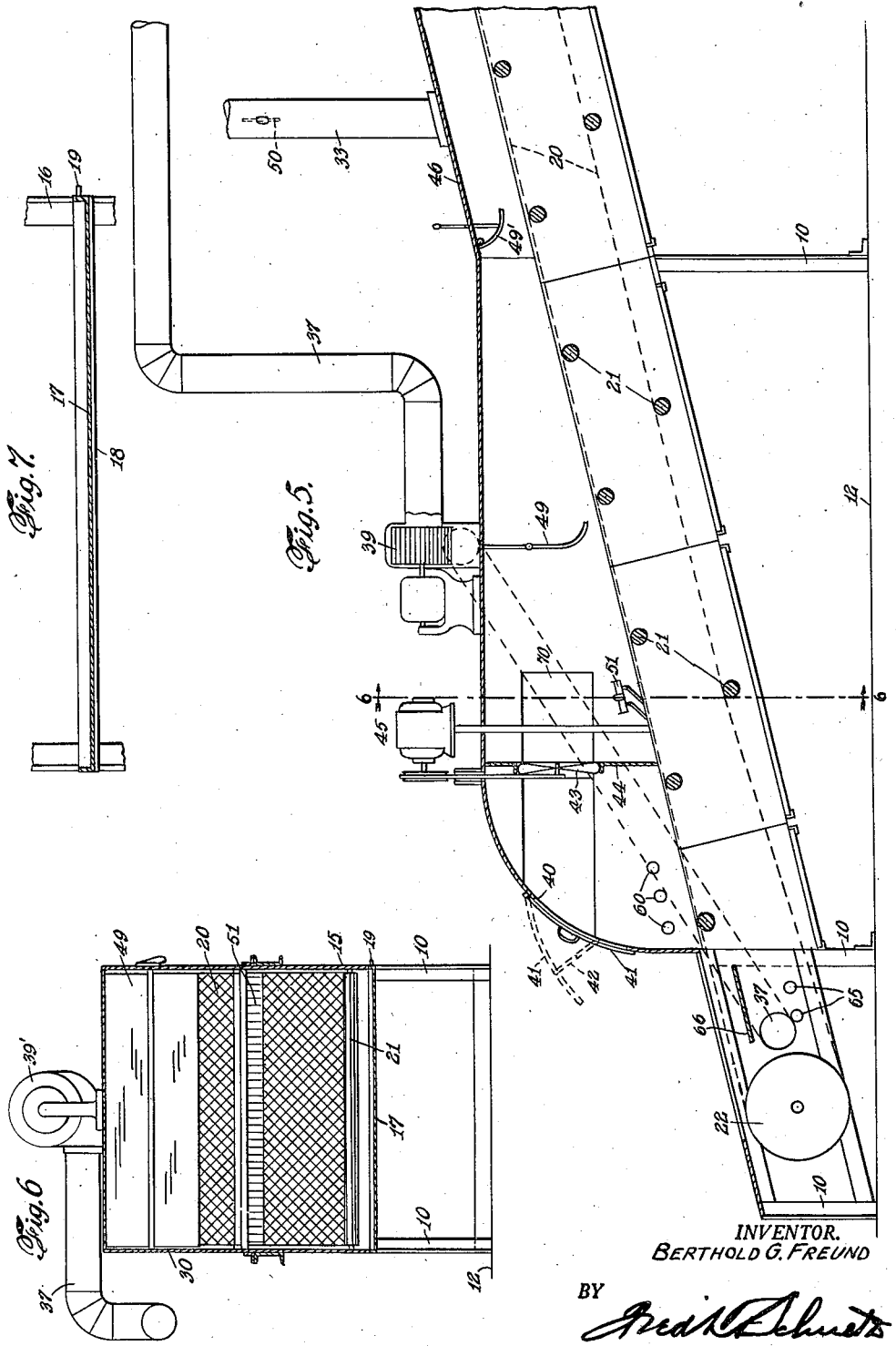
INVENTOR.
BERTHOLD G. FREUND
BY
ATTORNEY.

Patented Feb. 11, 1947

2,415,738

UNITED STATES PATENT OFFICE 2,415,738

ENDLESS CONVEYOR DRIER STRUCTURE

Berthold G. Freund, Forest Hills, N. Y.

Application February 6, 1943, Serial No. 474,978

7 Claims. (Cl. 34—216)

The invention relates to a system for dehydrating or desiccating materials such as cellulose products, food products and the like, and more especially to predehydrating apparatus which may be utilized therein and to the method of operating such apparatus.

In a prior U. S. Patent #2,293,728, granted to me the 25th day of August, 1942, I have disclosed one form of predehydrating apparatus through which the material to be dehydrated is conveyed and then automatically discharged, and wherein the heat applied to the material, effective to open the pores thereof, is completely controlled as to the degree of temperature.

The present invention has for an object a novel form of predehydrating apparatus whereby the material to be preliminarily dehydrated is more effectively handled.

A further object is to provide for mechanical transportation of the material continuously through the predehydrator, and also for mechanical agitation of the material in transit.

Another object of the invention is to provide in such apparatus a novel arrangement to effect stage dehydration of the material.

Still another object of the invention is to provide in addition to a control of temperature a staged control of the gaseous drying medium applied to the material to be preliminarily dehydrated.

The invention has for an object, also, to provide means for readily controlling the respective supplies of gaseous drying media.

A further object of the invention contemplates the provision of constructional features whereby access to various interior portions of the predehydrator may conveniently be had.

Another object of the invention is to provide a novel method of conserving the flavor of the material treated, particularly foods, and at the same time to increase the thermal efficiency of operation of the predehydrator.

In carrying out the invention, the novel predehydrating apparatus includes a mechanical conveyor means for transportation of the material, after it has been first properly prepared, to a main dehydrating unit which may be, for example, of the nature of that disclosed in my aforesaid U. S. Letters Patent #2,293,728. This conveyor comprises a foraminated endless belt of the required width and is operated at the desired speed to advance the material from a loading point to a point of discharge into the said main dehydrating unit.

In its travel, the conveyor passes through a more or less sealed casing which affords a succession of communicating and longitudinally extending drying chambers for a preliminary staged drying of the material, said conveyor protruding beyond the opposite ends of the casing to receive at the one end of the casing on its upper protruding surface the material to be dehydrated and at its far end being designed to discharge the same.

Each of the said chambers is provided with means for propelling a gaseous drying medium over the material during its progress through the casing, there being provided preferably in advance of and below the means for propelling gaseous medium a supply of heated gaseous medium which is supplied successively of lesser intensity in the direction of travel of the conveyor. Adjustable baffle means or dampers are preferably installed in the respective chambers beyond the gaseous medium propelling means for controlling the flow of the gaseous medium therethrough, and mechanical means are installed in said chambers for combing and agitating the material in transit.

Provision is made, also, for withdrawing spent moist medium from the respective compartments. To the first of these compartments there may be returned in advance of its gaseous medium propelling means a portion of the spent medium from the main dehydrating unit as well as from the last stage of the predehydrating apparatus for the purpose of conserving the flavor of the material as well as effecting increased thermal efficiency of the apparatus.

The nature of the invention, however, will best be understood when described in connection with the accompanying drawings, in which:

Fig. 1 is a front view of the complete predehydrating apparatus with an associated dehydrating apparatus; and Fig. 2 is a plan thereof.

Fig. 3 is an enlarged fragmentary front elevation of the initial conveyor portion and first of the succession of drying chambers of the predehydrating apparatus.

Fig. 4 is a transverse section taken on the line

4—4, Fig. 3 of the drawings, and looking in the direction of the arrows.

Fig. 5 is a longitudinal section through the portion of the apparatus shown in Fig. 3 of the drawings.

Fig. 6 is a transverse section taken on the line 6—6, Fig. 5 of the drawings, and looking in the direction of the arrows.

Fig. 7 is a fragmentary transverse section on an enlarged scale illustrating slides or trays forming the bottom of the predehydrator casing and the manner of mounting the same therein.

Fig. 8 is an enlarged longitudinal fragmentary section taken on the line 8—8, Fig. 2 of the drawings, and looking in the direction of the arrows.

In the specific embodiment of the invention illustrated in the drawings hereinbefore described, the predehydrating apparatus is indicated in an inclined position, being supported by vertical uprights or posts 10. It is to be understood, however, that this is merely for convenience when the same is to be associated with a dehydrator as the unit 11 supported at the same floor level 12, so that the material from the predehydrating apparatus may be discharged, for example, into a hopper 13 at the upper portion of the dehydrating unit. As hereinbefore noted, this dehydrating unit may be of the nature of that disclosed in my aforesaid U. S. Letters Patent #2,293,728.

The said predehydrating apparatus comprises an open-topped lower casing portion 15 of more or less rectangular cross-section and constituted, for example, of sheet metal or other suitable material built about a suitable frame 16 constructed of longitudinal and transverse angle iron members. The bottom of this portion or casing is preferably formed of a series of adjacently disposed slidable trays 17 mounted on the transverse angle pieces 18 of the frame. At the front, these trays may carry suitable handles 19 to assist in withdrawing the trays when it is desired to permit of access to the interior of the casing and to the conveyor, as well as to remove any matter collected by the trays and dropping from said conveyor which is designed to travel some distance above and over the trays through the casing. The conveyor is preferably of metal mesh or other suitable perforated material affording a foraminated endless belt member 20 which is suitably supported on rollers 21 and rolls over rotatable drums 22 and 23, respectively at the feeding and at discharge ends of the dehydrating unit, the conveyor at these portions protruding beyond the corresponding ends of the casing 15. Suitable driving mechanism for advancing the conveyor is indicated at 24 suspended, in the present embodiment, from the ceiling 25 which holds also a top for the casing, as indicated at 26.

This top or upper portion of the casing constitutes, generally, a succession of drying chambers 30, 31, and 32 communicating with one another in longitudinal arrangement over the exposed upper surface of the conveyor. From all of the drying chambers an exhaust connection is made as through the ducts 33, 34, and 35, respectively, to an exhaust main 36. It is preferred, also, for the purpose of conserving the flavor of the treated material, particularly foods, and at the same time conserving heat, to carry an exhaust connection 37 from the upper part of the dehydrating unit 11 to the lower portion of the casing in advance of the first drying chamber 30, for example, at the receiving protruding portion of the conveyor; and a cross-connection 38 also is made between the far duct 35 and said exhaust connection 37. To this end, a motor-driven suction blower 39 is interposed in the connection 37 at the dehydrator intake and a further blower 39' is provided at the far end of the exhaust connection, being mounted for convenience on the top of the drying chamber 30. The casing, as far as practicable, may be thermally insulated.

The first of the drying chambers, that is to say, the chamber 30, is provided at its entrance end with an opening 40 through which air or other gaseous medium may be introduced, the volume thereof being controllable by means of a cover 41. This is hinged to the casing 30 to swing upwardly and expose the opening 40 and may be set in adjusted position through a friction bracket 42 attached thereto and to the casing. The gaseous medium entering the chamber 30 above the upper reach of the conveyor is advanced through the chamber 30 by means of a fan or the like 43 mounted in a transverse partition 44 extending across the chamber from the top to a point just above the upper reach of the conveyor. This fan may be driven through intermediate mechanism from a suitable motor 45 supported externally of the casing on an extension of the framework. Similar advancing means for gaseous medium are provided in the remaining sections and by controlling the speed of the respective motors the desired regulation of the flow of gaseous medium may be obtained.

Each of the drying chambers tapers toward its discharge end and the series is connected by respective extension sections 46 and 47 of reduced cross-section to which the exhaust connections or ducts 33 and 34 are made, with the connection 35 being made to the extension 48 of the last drying chamber. For more effective control of the circulation through a chamber, a suitable adjustable baffle may be provided in each chamber, for example, the swingably mounted baffle 49 with outwardly curved lower edge, as indicated in Figs. 3 and 5 of the drawings, said baffle being designed to shut off more or less the flow from the top of the chamber and divert the flow toward the conveyor. If desired, an additional baffle element 49' may be provided also in each of the connecting extensions 46, 47, and 48. Dampers 50 may also be introduced in the connections 33, 34, and 35 from these connecting extensions.

It is preferred to install suitable rake means 51 in the different compartments between the fan and baffle thereof, the teeth of a rake means being directed toward the material on the conveyor pointing in a direction opposite to its travel to spread the same uniformly thereover and to agitate it for better exposure to the gaseous drying medium. Several of these rakes are arranged transversely of the belt one behind the other, with the teeth of respective rakes staggered. Similar rake means 52 are associated with the conveyor at its protruding discharge end, being directed upwardly thereto to strip material therefrom, while a scraper 53 and a rotating brush 54 may be located beyond the rakes for cleaning the conveyor surface prior to its return travel to the entrance portion of the predehydrator.

There is included in each chamber suitable means for heating or for supplying a heated gaseous medium therein, for example, one or more gas burners 60, in the case of the first chamber the heating means comprising three burners. In the case of the second chamber, only two burners 61 are provided, while in the third and final chamber, only a single burner 62 is provided. All of these heating means are located preferably in advance of the corresponding fan for a chamber and below the fan intake so as to provide for a properly heated gaseous medium which is to be propelled over the material. In addition, a single burner 63 is provided between the upper and lower reaches of the conveyor and is located preferably midway of the ends of the conveyor, there being provided over said burner 63 a suitable baffle plate 64 to prevent direct flame impingement upon the conveyor. A further heating means, namely: the burners 65, are provided between the conveyor reaches at the protruding portion 20 where the material to be dehydrated is loaded, and a baffle plate 66 is similarly interposed to prevent direct impingement of the flame upon the conveyor.

To admit of inspection of the interior of the chambers 30, 31, and 32, the same are provided with respective slidable window sashes 70, 71, and 72, for example, in the front and rear walls of the apparatus.

It will be understood that suitable heat-control and heat-measuring devices may be installed in the different drying chambers, but the same form no part of the present invention other than to maintain the desired temperature conditions within the respective compartments, which conditions for most purposes contemplate a successive decrease in temperature therein of the heated gaseous medium, applied to the material advanced by the conveyor, in the direction of travel of said conveyor.

Suitable control means (not shown) for the speed of the fans propelling the heating medium afford, together with the adjusting means 42 for the intake volume of the medium, the desired regulation of drying conditions, the same being proportioned, also, to the speed of the conveyor.

In some instances, the novel apparatus herein described may be utilized for completing the dehydration to the desired degree without resorting to further treatment as in the rotary dehydrator aforesaid; and it is to be understood that I am not limited to its use solely for predhydrating purposes.

I claim:

1. Predehydrating apparatus, comprising an elongated casing including a top with consecutive inwardly-directed end walls to divide the casing into a succession of communicating and longitudinally extending drying chambers, and vertical partitions located respectively therein transversely thereto, each of which is provided with an opening, there being provided in each chamber end wall in advance of its partition a controllable opening for gaseous drying medium, an endless foraminated conveyor travelling through the casing beneath said partitions and end walls, the upper reach thereof forming the floor of the respective drying chambers and conveying successively through the chambers material to be dried, said conveyor extending through opposite ends of the casing to provide at one end thereof a protruding receiving portion to receive material to be dried and at the opposite end of the casing a protruding discharge portion for dried material, and respective fans housed in the opening of each partition for directing a stream of gaseous drying medium through the corresponding drying chambers and from one chamber to the next one, all in the direction of travel of the upper reach of the conveyor and immediately over the material conveyed thereby.

2. The combination of claim 1 wherein the drying chambers contract toward their respective delivery ends.

3. The combination of claim 1 wherein each drying chamber includes a tapering portion, formed by the top with reference to the conveyor, in which chamber is located the corresponding vertical partition with fan, said portion extending along the conveyor at an angle thereto, and a contracted portion similarly formed by the top substantially parallel to the conveyor, the latter portion communicating with the former portion of the next succeeding chamber, the casing at the rear end walls of the tapering portions of the respective drying chambers being provided with an opening behind the corresponding openings of the partitions and on the intake side of the fans located therein.

4. The combination of claim 1 wherein the casing is inclined upwardly and each drying chamber includes a tapering portion, formed by the top with reference to the conveyor, in which chamber is located the corresponding vertical partition with fan, said portion extending along the conveyor at an angle thereto, and a contracted portion similarly formed by the top substantially parallel to the conveyor, the latter portion communicating with the former portion of the next succeeding chamber, the casing at the rear end walls of the tapering portions of the respective drying chambers being provided with an opening behind the corresponding openings of the partitions and on the intake side of the fans located therein, together with means to control the extent of such opening.

5. The combination of claim 1 wherein each drying chamber includes a tapering portion, formed by the top with reference to the conveyor, in which chamber is located the corresponding vertical partition with fan, said portion extending along the conveyor at an angle thereto, a contracted portion similarly formed by the top substantially parallel to the conveyor, the latter portion communicating with the former portion of the next succeeding chamber, the casing at the rear end walls of the tapering portions of the respective drying chambers being provided with an opening behind the corresponding openings of the partitions and on the intake side of the fans located therein, together with an adjustable cover to control the effective area of such opening, and control means are provided at the intake of the respective contracted parallel portions.

6. The combination of claim 1 wherein raking means are provided at the protruding discharge portion of the conveyor to separate material therefrom, and brushing means are provided beyond said raking means to brush the exposed conveyor surface clear of any adhering material.

7. The combination of claim 1 wherein trays are mounted beneath each of the chambers transversely of the casing below the conveyor to constitute the bottom of said casing and are laterally slidable therein for removal.

BERTHOLD G. FREUND.

REFERENCES CITED

The following references are of record in the file of this patent:

UNITED STATES PATENTS

| Number | Name | Date |
|---|---|---|
| 648,248 | Edwards | Apr. 24, 1900 |
| 1,751,552 | Kehoe | Mar. 25, 1930 |
| 863,830 | Ashley et al. | Aug. 20, 1907 |
| 1,770,409 | Kehoe | July 15, 1930 |
| 1,668,446 | Anderson | May 1, 1928 |
| 1,580,957 | Chaffe et al. | Apr. 13, 1926 |
| 1,670,991 | Schilde | May 22, 1928 |
| 718,770 | Keith et al. | Jan. 20, 1903 |
| 1,950,942 | Haas | Mar. 13, 1934 |
| 712,894 | Ball | Nov. 4, 1902 |
| 1,981,197 | Roberts | Nov. 20, 1934 |
| 2,334,721 | McMordie et al. | Nov. 23, 1943 |
| 1,508,283 | Kerst | Sept. 9, 1924 |
| 2,326,115 | Arthur | Aug. 10, 1943 |
| 2,293,728 | Freund | Aug. 25, 1942 |
| 2,230,832 | Douglas | Feb. 4, 1941 |
| 1,572,326 | Straight | Feb. 9, 1926 |
| 1,965,209 | Allsop | July 3, 1934 |
| 1,744,884 | Greiner | Jan. 28, 1930 |

FOREIGN PATENTS

| Number | Country | Date |
|---|---|---|
| 81,051 | German | May 9, 1895 |
| 371,869 | German | Mar. 22, 1923 |
| 487,822 | German | Dec. 16, 1929 |
| 114,290 | Australian | Nov. 25, 1941 |